(No Model.)

W. H. FULLER.
PHOTOGRAPHIC PLATE HOLDER.

No. 428,809. Patented May 27, 1890.

Witnesses
C. R. Ferguson
Wm. Robinson

Inventor
Willard H. Fuller
By his attorneys
Gifford Brown

UNITED STATES PATENT OFFICE.

WILLARD H. FULLER, OF PASSAIC, NEW JERSEY, ASSIGNOR TO THE SCOVILL & ADAMS COMPANY, OF NEW YORK, N. Y.

PHOTOGRAPHIC-PLATE HOLDER.

SPECIFICATION forming part of Letters Patent No. 428,809, dated May 27, 1890.

Application filed January 17, 1889. Serial No. 296,624. (No model.)

*To all whom it may concern:*

Be it known that I, WILLARD H. FULLER, of Passaic, in the county of Passaic and State of New Jersey, have invented a certain new and useful Improvement in Photographic-Plate Holders, of which the following is a specification.

My improvement relates to plate-holders for use with films, sheets, or thin plates of celluloid or analogous material.

I will describe a plate-holder embodying my improvement, and then point out the novel features in the claims.

Figure 1:
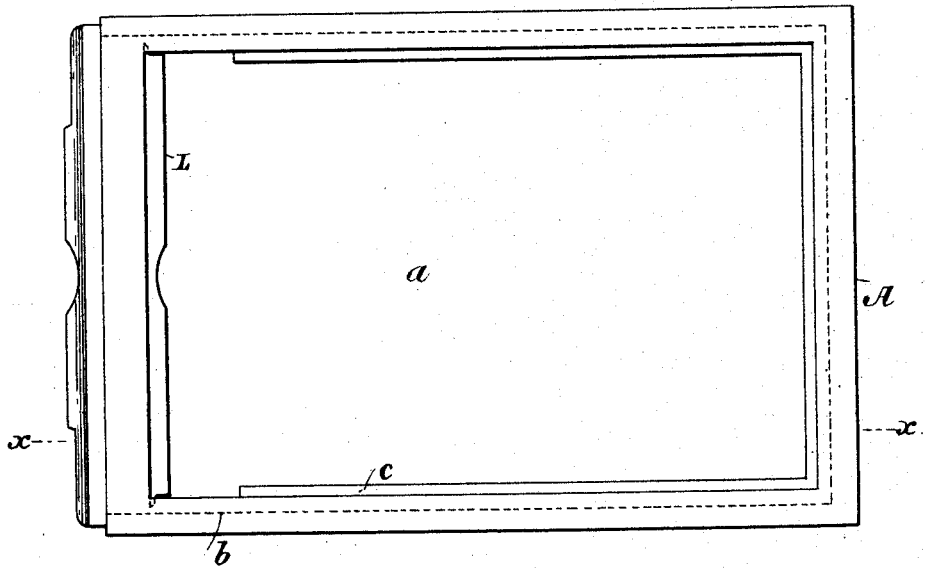
Figure 2:

In the accompanying drawings, Figure 1 is a plan or top view of a plate-holder embodying my improvement, one of the shutters being removed; and Fig. 2 is a longitudinal section thereof, taken at the plane of the dotted line $x\ x$, Fig. 1.

Similar letters of reference designate corresponding parts in both figures.

A designates a rectangular frame. It may be made of wood or any other suitable material. Midway between the two sides a diaphragm $a$ extends across it. This diaphragm divides the plate-holder into two compartments $a'\ a^2$. Each compartment is intended to contain a film, sheet, or thin plate of celluloid or analogous material sensitized suitably for photographic uses. With each compartment there is combined a shutter B. This is made in the form of an ordinary sliding shutter. It slides in grooves $b$ in a well-known manner, and is provided at one end with a hand-piece, by which it may be conveniently manipulated. Each compartment of this plate-holder is also provided with grooves $c$, in which the edges of a film, sheet, or thin plate of celluloid or like material inserted in a compartment may fit. The grooves $c$ extend across one end and down each side to nearly the opposite end and embrace three sides or edges of the thin sheet. By this means the film, sheet, or plate will be held perfectly flat. At the end of the plate-holder at which the shutters enter each compartment is provided with a swinging lip L. This swinging lip consists of a flat plate or strip of metal having lugs extending from the rear edge into the frame and serving as pivots. After the insertion of a sheet, film, or plate C, of celluloid or like material, the lip L belonging to the compartment in which it is inserted is folded down over the end of said sheet, film, or plate. I have shown the lip L of the compartment $a'$ raised, there being no sheet, film, or plate in that compartment; but in the compartment $a^2$, I have shown a sheet, film, or plate C, and therefore have shown the lip L swung down against it. It will be seen that the shutter holds the lip down when swung down upon the sheet, film, or plate.

What I claim as my invention, and desire to secure by Letters Patent, is—

1. In a plate-holder, the combination of a frame provided with grooves for a film, sheet, or plate, and shutter-grooves or sliding shutter, and a swinging lip having pivotal bearings in the frame and constructed to impinge upon a film, sheet, or plate and held thereon by the sliding shutter, substantially as specified.

2. A plate-holder consisting of a frame provided with grooves for a sliding shutter, grooves for a film, sheet, or plate extending around the sides and one end of the frame, and a swinging lip for impinging against said film, sheet, or plate, substantially as specified.

WILLARD H. FULLER.

Witnesses:
K. L. BRENNAN,
EDWIN H. BROWN.